United States Patent
Kuo et al.

(10) Patent No.: US 7,319,303 B2
(45) Date of Patent: Jan. 15, 2008

(54) METHOD AND APPARATUS FOR ESTIMATING THE POSITION OF A MOVING PART OF A LINEAR ACTUATOR

(75) Inventors: Li-Te Kuo, Hsinchu County (TW); Hsing-Cheng Yu, Hsinchu County (TW); Tzung-Yuan Lee, Taichung County (TW); Shyh-Jier Wang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/532,103

(22) Filed: Sep. 15, 2006

(65) Prior Publication Data

US 2007/0145935 A1   Jun. 28, 2007

(30) Foreign Application Priority Data

Dec. 23, 2005   (TW) .............................. 94146076 A

(51) Int. Cl.
   *H02K 41/02*   (2006.01)
   *G05B 11/00*   (2006.01)
(52) U.S. Cl. ...................... 318/687; 318/135; 318/603; 318/653
(58) Field of Classification Search ................ 318/135, 318/560, 603, 605, 626, 636, 640, 647, 653, 318/687
See application file for complete search history.

(56) References Cited

U.S. PATENT DOCUMENTS

| | | | |
|---|---|---|---|
| 4,270,077 A | * | 5/1981 | Swartz et al. ............... 318/661 |
| 4,641,020 A | * | 2/1987 | Iwai ......................... 250/201.5 |
| 5,115,421 A | * | 5/1992 | Rokutan ................... 369/44.33 |
| 5,453,684 A | | 9/1995 | Nakayama |
| 5,745,452 A | * | 4/1998 | Ko ........................... 369/44.29 |
| 6,873,148 B2 | | 3/2005 | Morimoto |
| 7,187,630 B2 | * | 3/2007 | Kataoka et al. .......... 369/44.27 |
| 7,257,052 B2 | * | 8/2007 | Watanabe et al. ........ 369/44.26 |

OTHER PUBLICATIONS

Hsing-Cheng Yu, et al. "Low power consumption focusing actuator for a mini video camera", Journal of Applied Physics, 50th Annual Conference on Magnetism and Magnetic Materials, San Jose, CA, Oct. 30-Nov. 3, 2005. J. Appl. Phys. 99, 08R901 (Published online Apr. 17, 2006).

* cited by examiner

*Primary Examiner*—Bentsu Ro
(74) *Attorney, Agent, or Firm*—Jianq Chyun IP Office

(57) ABSTRACT

A method and an apparatus for estimating the position of a moving part of a linear actuator are provided. The method comprises the following steps. Move the moving part towards a target position. Receive magnetic signals generated by the magneto-resistive sensor of the linear actuator, which include a sine signal and a cosine signal. Then, generate a first square wave, a second square wave, and a regional square wave based on the sine signal and the cosine signal. Generate a saw-tooth wave based on the sine signal, the cosine signal, the second square wave, and the regional square wave. Next, calculate the number of regions which the moving part is across from the origin point based on the first square wave, the second square wave, and the regional square wave. Finally, estimate the current position of the moving part based on the saw-tooth wave and the number of regions.

19 Claims, 9 Drawing Sheets

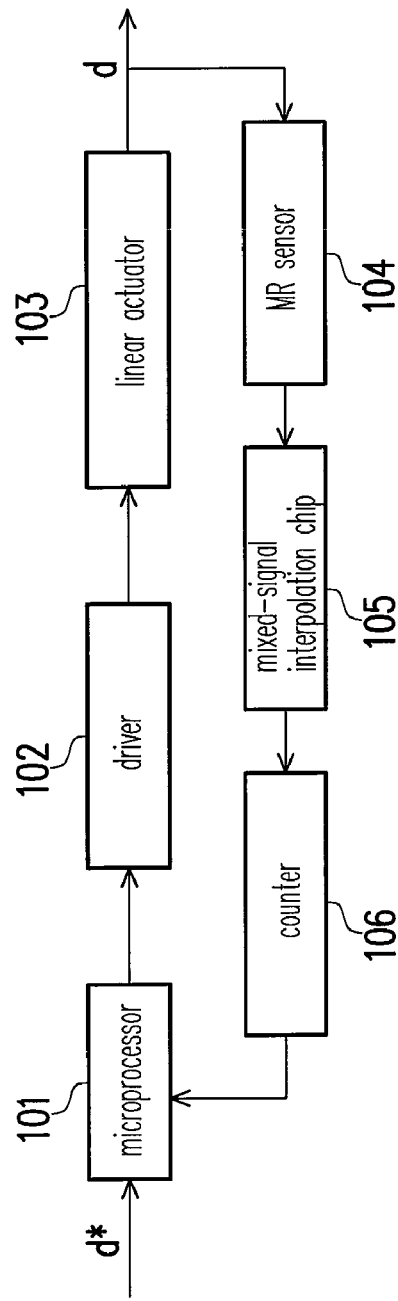
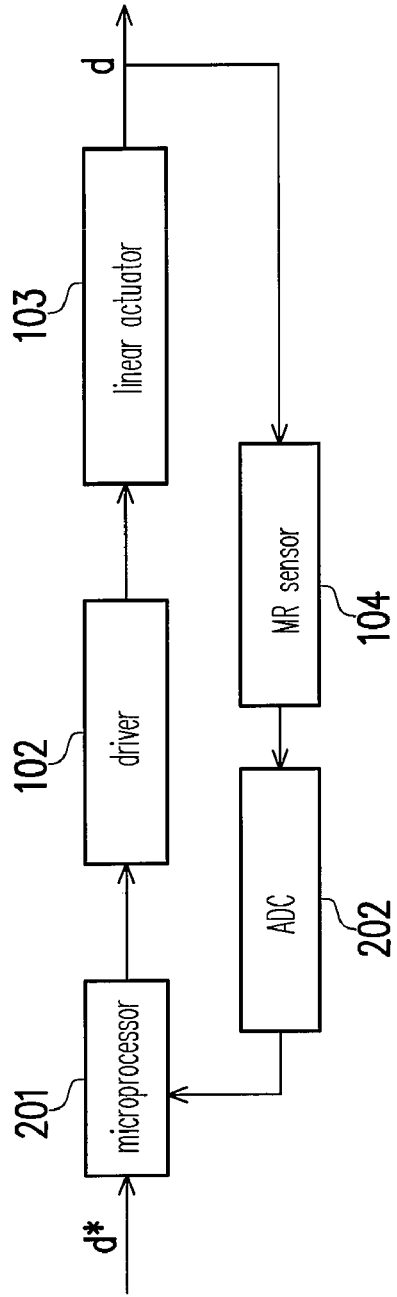
FIG. 1 (PRIOR ART)
FIG. 2 (PRIOR ART)

METHOD AND APPARATUS FOR ESTIMATING THE POSITION OF A MOVING PART OF A LINEAR ACTUATOR

CROSS-REFERENCE TO RELATED APPLICATION

This application claims the priority benefit of Taiwan application serial no. 94146076, filed on Dec. 23, 2005. All disclosure of the Taiwan application is incorporated herein by reference.

BACKGROUND OF THE INVENTION

1. Field of Invention

The present invention relates to a position feedback control architecture of a linear actuator, and more particularly, to a method and apparatus for estimating the position of a moving part of a linear actuator.

2. Description of Related Art

The conventional position actuator generally employs a stepper motor as the driving device. However, stepping motors have many limitations. For example, the position speed is not fast enough, which is time and power consuming for the system when the position is achieved at a low speed; and relatively high mechanical noise occurs during position operation. Therefore, in order to improve the position properties and to efficiently reduce the hardware cost, a position feedback control through the linear actuator along with the magnetic scale has become the future trend.

FIG. 1 shows a position feedback control architecture for a conventional linear actuator. In the architecture of FIG. 1, when the moving part of the linear actuator 103 moves, a magneto-resistive sensor (MR sensor) 104 generates two magnetic signals with a phase difference of 90 degrees. The mixed-signal interpolation chip 105 converts the magnetic signals into pulse signals to be counted by a counter 106. Then, the counter 106 sends the counted values to a microprocessor 101, so as to obtain the position of the moving part of the linear actuator 103. The main defect of this architecture lies in that the price of the mixed-signal interpolation chip 105 is extremely high.

FIG. 2 depicts another type of position feedback control architecture for a conventional linear actuator 103 without the mixed-signal interpolation chip 105. In the architecture of FIG. 2, an analog-to-digital converter (ADC) 202 converts the magnetic signals from the MR sensor 104 into digital sample values, and then sends them to a microprocessor 201 to be analyzed, so as to estimate the position of the moving part of the linear actuator 103. This architecture utilizes an algorithm implemented by the microprocessor 201 instead of the expensive mixed-signal interpolation chip 105. However, the conventional algorithms all require complicated and redundant computations, and require much time for floating-point computation, which adversely influences the position efficiency.

SUMMARY OF THE INVENTION

An object of the present invention is to provide a method for estimating the position of a moving part of a linear actuator, with the advantage of simple and rapid calculation, thereby reducing the cost of the magnetic scale and enhancing the resolution.

Another object of the present invention is to provide an apparatus for estimating the position of a moving part of a linear actuator, with the advantage of being simple and rapid, thereby further reducing the system cost and further enhancing the resolution.

In order to achieve the above and other objects, the present invention provides a method for estimating the position of a moving part of a linear actuator, which comprises the following steps. First, (a) move the moving part of the linear actuator towards a target position; (b) receive magnetic signals from the MR sensor, which include a sine signal and a cosine signal; (c) generate a first square wave, a second square wave, and a regional square wave based on the sine signal and the cosine signal; (d) generate a saw-tooth wave based on the sine signal, the cosine signal, the second square wave, and the regional square wave; (e) calculate the number of regions which the moving part is across from the origin point of the sliding track on which the moving part is mounted based on the first square wave, the second square wave, and the regional square wave; finally, (f) estimate the current position of the moving part of the linear actuator based on the saw-tooth wave and the number of regions.

By using the method for estimating the position of the moving part of the linear actuator, in an embodiment, step (e) comprises the following steps. First, identify the moving direction of the moving part of the linear actuator based on the first square wave and the second square wave. Then, calculate the number of regions which the moving part of the linear actuator is across from the origin point based on the direction of movement and the rising edge and falling edge of the regional square wave.

In the method for estimating the position of the moving part of the linear actuator, in an embodiment, step (f) comprises the following steps. First, estimate the local position of the moving part based on the pole pitch of the linear magnetic strip with alternate polarity and the above saw-tooth wave. Then, estimate the current position of the moving part of the linear actuator based on the pole pitch, the number of regions which the moving part of the linear actuator is across from the origin point, and the local position.

From another perspective, the present invention further provides an apparatus for estimating the position of a moving part of a linear actuator, which comprises a magnetic signal processor, a saw-tooth wave generator, a saw-tooth region counter, and a position signal estimator. The magnetic signal processor generates a first square wave, a second square wave, and a regional square wave based on a sine signal and a cosine signal generated by an MR sensor of the linear actuator. The saw-tooth wave generator generates a saw-tooth wave based on the sine signal, the cosine signal, the second square wave, and the regional square wave. The saw-tooth region counter calculates the number of regions which the moving part is across from the origin point of the sliding track based on the first square wave, the second square wave, and the regional square wave. And the position signal estimator estimates the current position of the moving part of the linear actuator based on the above saw-tooth wave and the number of regions.

In an embodiment of the above apparatus for estimating the position of a moving part of a linear actuator, the first square wave is generated based on the sum of the sine signal and the cosine signal; the second square wave is generated based on the difference of the sine signal and the cosine signal; and the regional square wave is generated based on the logic operation results of the first square wave and the second square wave.

In an embodiment of the above apparatus for estimating the position of a moving part of a linear actuator, the saw-tooth wave generator comprises a first switch, an inverter, and a second switch. The first switch receives the sine signal and the cosine signal. If the regional square wave is in a first state, the sine signal is the output; if the regional square wave is in a second state, the cosine signal is the output. The inverter is coupled to the output end of the first switch. The second switch is coupled to the output end of the first switch and the output end of the inverter. If the second square wave is in a third state, the output signal of the inverter is output; if the second square wave is in a fourth state, the output signal of the first switch is output.

In an embodiment of the above apparatus for estimating the position of a moving part of a linear actuator, the position signal estimator comprises an extremum detector, a multiplier, and an accumulator. The extremum detector detects the maximum and minimum values of the saw-tooth wave, and outputs the result obtained by subtracting the minimum value from the maximum value of the saw-tooth wave. The multiplier multiplies the above number of regions with the output value of the extremum detector and then outputs the obtained results. Finally, the accumulator adds the saw-tooth wave with the output value of the multiplier to generate the linear function of the current position of the moving part.

According to a preferred embodiment of the present invention, the above method for estimating the position of a moving part of a linear actuator employs the calculation and analysis of the microprocessor instead of the expensive mixed-signal interpolation chip, such that the calculation process is much simpler and more rapid compared with the conventional method, thereby, the cost can be reduced, and the defect of the slow and redundant conventional algorithms can be avoided. Moreover, the present method uses the magnetic signals output by the MR sensor to carry out the calculation by way of linear approximation, and if an ADC with high resolution is used together, the resolution can be achieved to replace the conventional interpolation chip.

The above apparatus for estimating the position of a moving part of a linear actuator is mainly the implementation of the above method through hardware; therefore, it has the advantages of being simple, rapid, and reducing costs as well. Moreover, the apparatus does not require the microprocessor, such that the system cost can be further reduced. Also, the present apparatus is a hardware architecture, such that the successive random position can be achieved without any resolution problem.

In order to achieve the aforementioned and other objects, features and advantages of the present invention comprehensible, a preferred embodiment accompanied with figures is described in details below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 and FIG. 2 are architecture diagrams of position feedback controls for conventional linear actuators;

DESCRIPTION OF EMBODIMENTS

Figure 3:
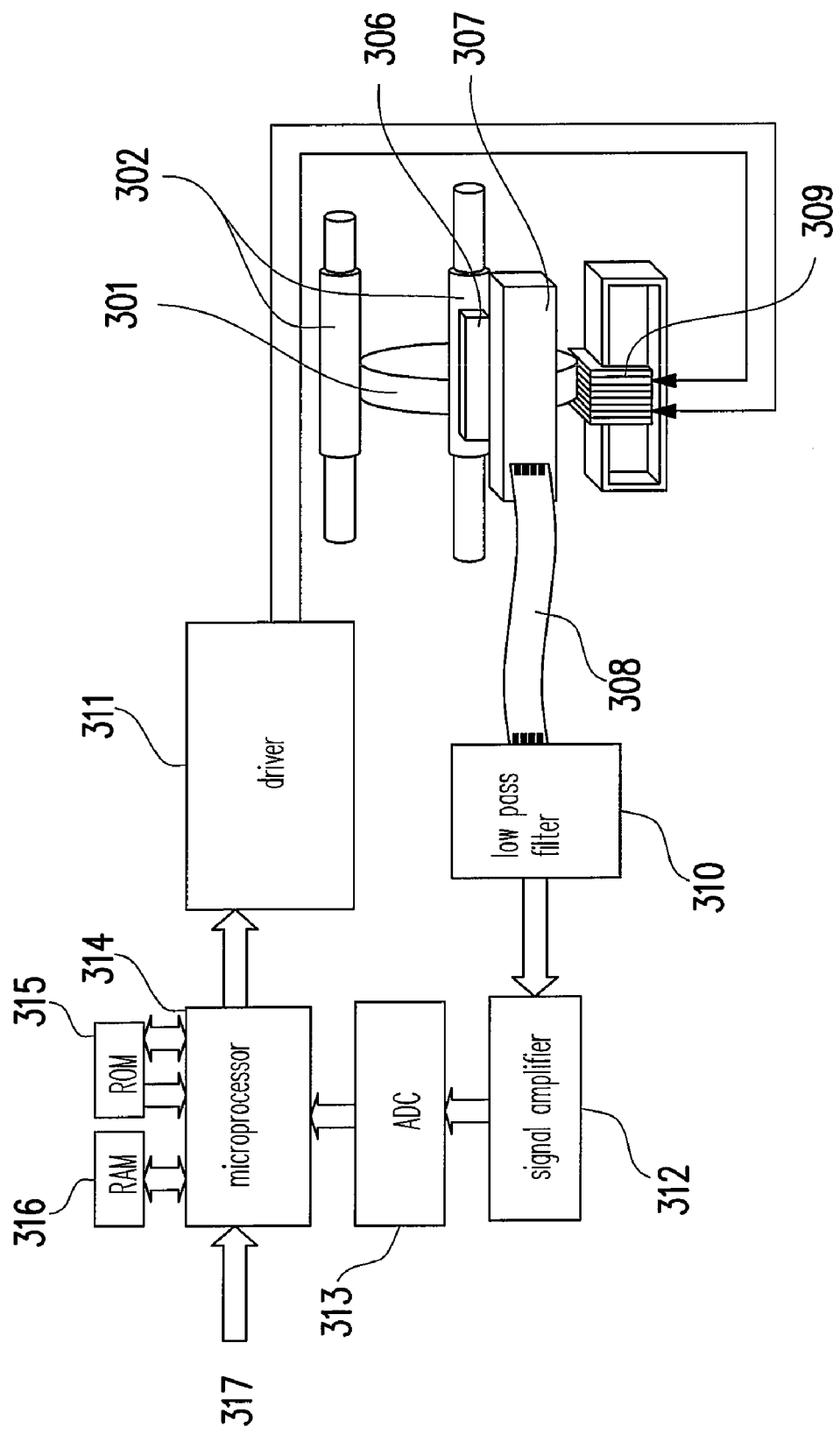
FIG. 3 is an architecture diagram of a position feedback control of a linear actuator according to an embodiment of the present invention.

FIG. 3 is an architecture diagram of a position feedback control for a linear actuator according to an embodiment of the present invention, which uses a digital video camera or digital camera as an example. In FIG. 3, the moving part of the linear actuator comprises a moving coil 309, a lens holder 301, a linear magnetic strip 306 with alternating polarities, and a sleeve tube 302. The digital circuit for controlling the linear actuator comprises a microprocessor 314, an ADC 313, a read-only memory (ROM) 315, and a random access memory (RAM) 316. The microprocessor 314 receives the commands and data 317 from the image digital signal processor (not shown). A driver 311 receives the digital data and control command from the microprocessor 314, and then generates different driving voltages based on the received commands so as to drive the moving part of the linear actuator. When the moving part of the linear actuator moves, an MR sensor 307 shifts relatively to the linear magnetic strip 306 mounted on the moving part of the linear actuator. When the MR sensor 307 senses various magnetic forces of the linear magnetic strip 306, it generates two groups of magnetic signals, i.e., a sine signal and a cosine signal, with a phase difference of 90 degrees. The two groups of magnetic signals are sent to a low pass filter 310 through a soft cable 308 to filter the noises. Then, the modified voltage is properly adjusted into an acceptable range of the ADC 313 through a signal amplifier 312. And finally, the two groups of processed magnetic signals are converted into digital data through the ADC 313 and are sent to the microprocessor 314 to be calculated. In fact, the ADC 313 may comprise two separate ADCs to convert the two groups of magnetic signals respectively. The microprocessor 314 is used to carry out the method for estimating the position of a moving part of a linear actuator provided in the present invention, and the position of the moving part of the linear actuator can be estimated rapidly and accurately.

In the architecture of FIG. 3, if the magnetic signals generated by the MR sensor 307 have a desirable quality and filtering the noise is not necessary, the low pass filter 310 can be omitted. Moreover, if the modified voltages of the magnetic signals are high enough to be directly processed by the ADC 313, the signal amplifier 312 can be omitted as well.

Figure 4:
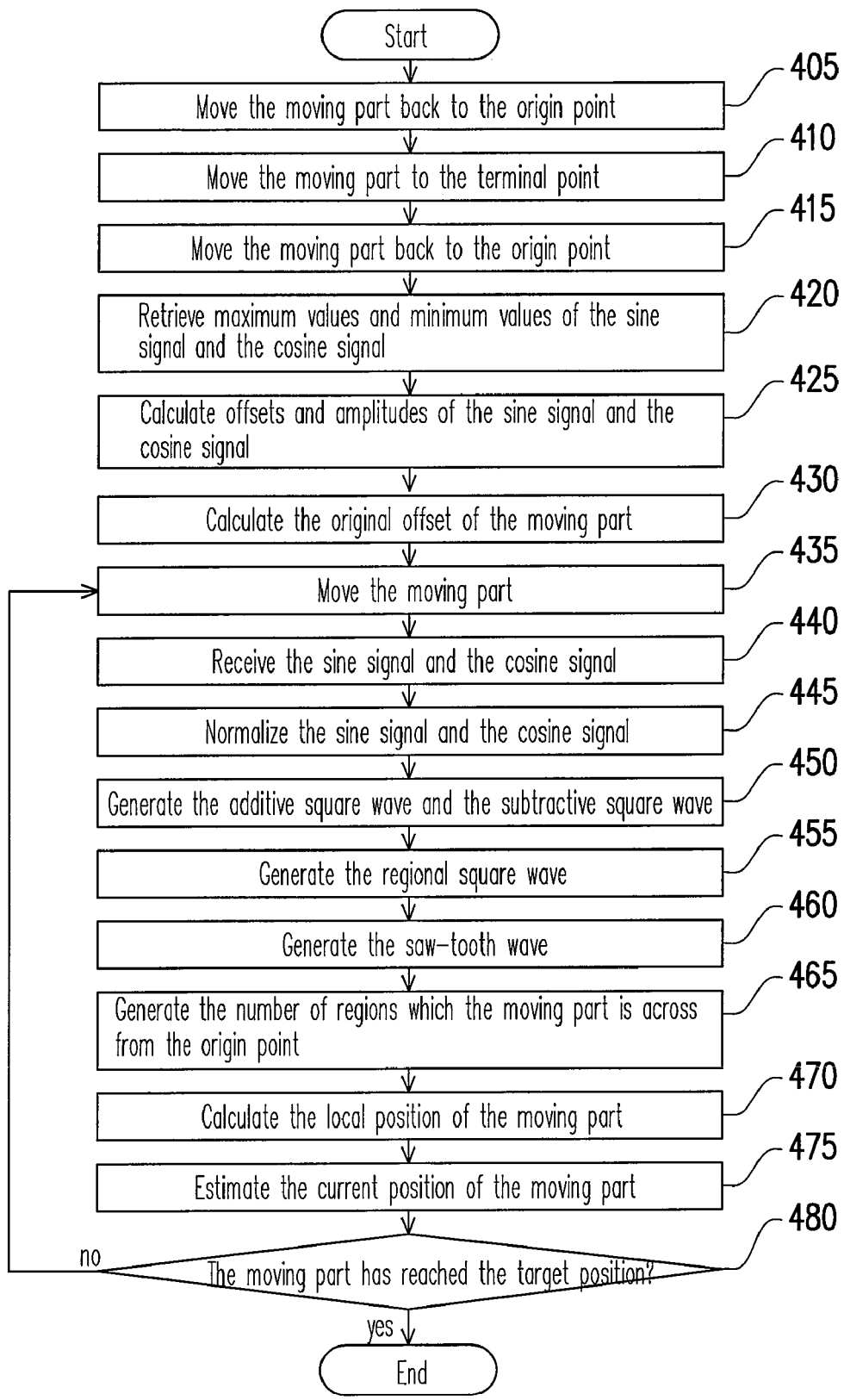
FIG. 4 is a flow chart of a method for estimating the position of a moving part of a linear actuator according to an embodiment of the present invention.
Figure 5:
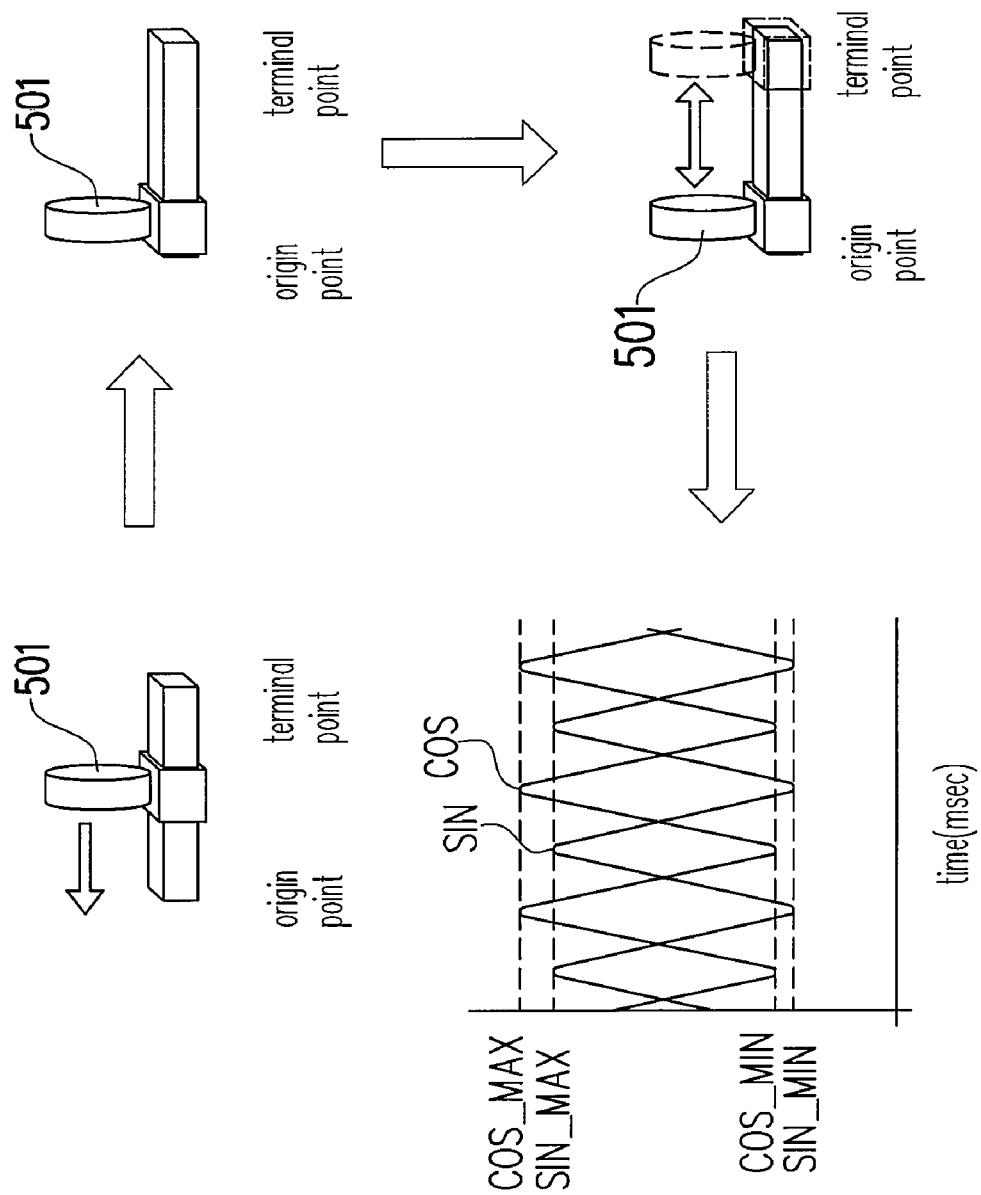
FIG. 5 is a schematic view of the moving manner of the moving part of the linear actuator and the original magnetic signals during the system initialization according to an embodiment of the present invention.
Figure 6:
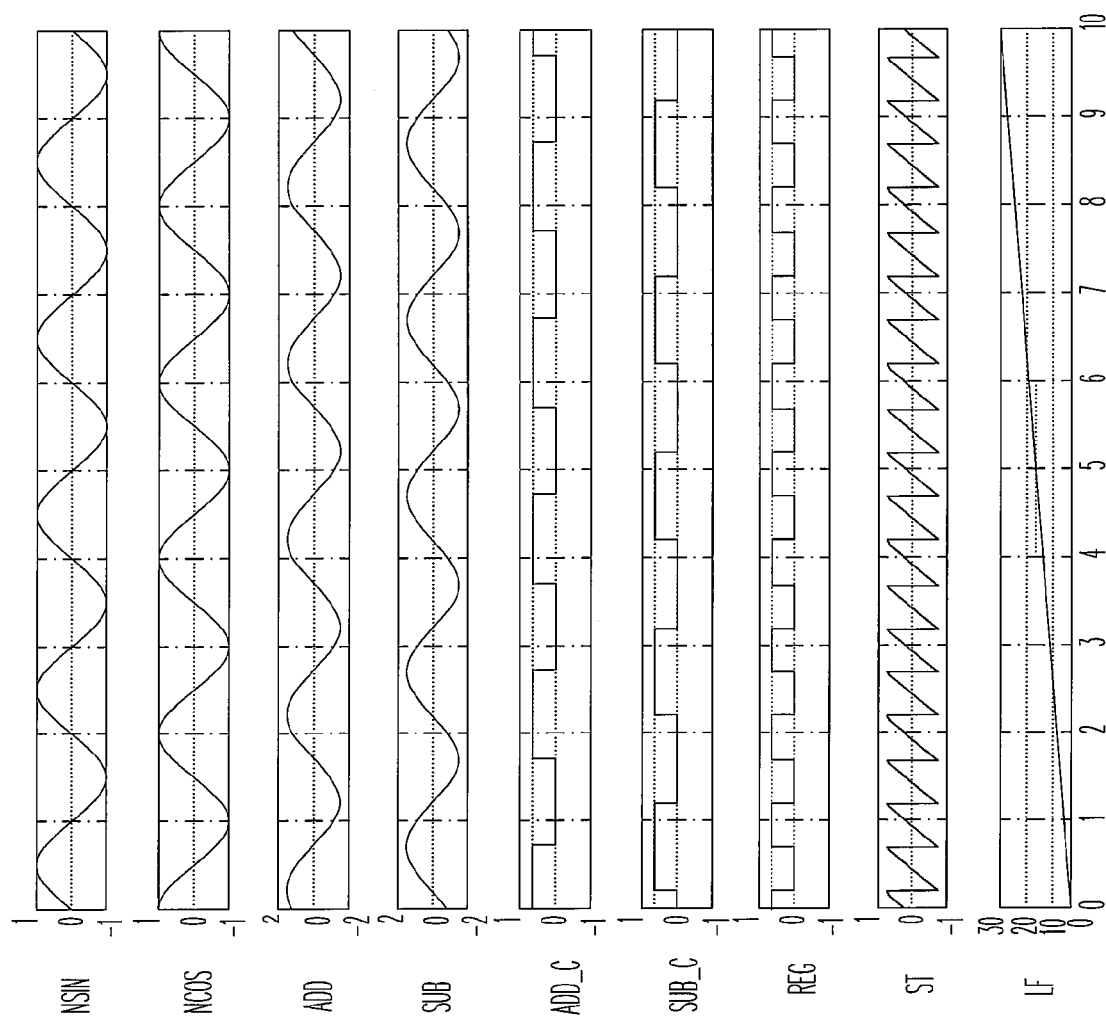
FIG. 6 is a timing diagram of various signals according to an embodiment of the present invention.

FIG. 4 is a flow chart of a method for estimating the position of a moving part of a linear actuator carried out by the microprocessor 314. First, there are a series of initialization actions when powering on the system. And then the following illustration can be made with reference to FIGS. 5 and 6. FIG. 5 depicts the moving process of a moving part 501 of the linear actuator and the original magnetic signals output by the MR sensor 307 during initialization actions. FIG. 6 depicts the waves and timings of various signals according to the present embodiment.

The initialization actions start from Step 405. In Step 405, the microprocessor 314 commands the moving part 501 of the linear actuator to move back to the origin point of the sliding track on which the moving part 501 is mounted; and then, in step 410, it commands the moving part 501 to move to the terminal point of the sliding track. When the moving part 501 moves, the MR sensor 307 outputs a sine signal SIN and a cosine signal COS, as shown in FIG. 5. The microprocessor 314 receives the digital sample values that have been converted by the ADC 313 instead of the original sine signal SIN and cosine signal COS. In the following description, the sample values received by the microprocessor 314 can be considered as successive signals, as long as the sampling frequency and resolution of the ADC 313 are sufficiently high.

After the moving part 501 reaches the terminal point, in step 415, the microprocessor 314 commands the moving part 501 to moves from the terminal point back to the origin point once again. During the above moving process, the microprocessor 314 has already obtained sufficient sample values, such that a comparison can be made in step 420 to retrieve the maximum value SIN_MAX and minimum value SIN_MIN of the sine signal SIN, and the maximum value COS_MAX and minimum value COS_MIN of the cosine signal COS, as shown in FIG. 5. Then, in step 425, the offset values (OFFSET) and amplitudes (AMP) of the sine signal SIN and the cosine signal COS are calculated based on the above four extremums, with the calculation formula as follows.

SIN_OFFSET=(SIN_MAX+SIN_MIN)/2

SIN_AMP=(SIN_MAX−SIN_MIN)/2

COS_OFFSET=(COS_MAX+COS_MIN)/2

COS_AMP=(COS_MAX−COS_MIN)/2

The above initialization steps need to be carried out each time when booting the system, so as to ensure that the above offset values and amplitude parameters change along with outside factors such as the ambient temperature. Thus, although the magnetic signals are influenced by various factors, it still can be ensured that errors do not occur in the position estimation of the moving part 501.

Then, in step 430, the original offset of the moving part 501 is calculated based on the pole pitch of the linear magnetic strip 306 and the magnetic signals SIN, COS. The reason why the original offset is calculated and the details of the calculation process are illustrated in detail below.

Next, the main loop of this method is illustrated. In step 435, the microprocessor 314 commands the moving part 501 to move towards the target position. And then, in step 440, the sine signal SIN and cosine signal COS processed by the ADC 313 are received. Then, in step 445, the sine signal SIN and cosine signal COS are normalized based on the offsets and amplitudes of the sine signal SIN and cosine signal COS, with the calculation formula as follows.

$N$ SIN=(SIN−SIN_OFFSET)/SIN_AMP $N$ COS=(COS−COS_OFFSET)/COS_AMP, wherein, NSIN is a normalized sine signal after the normalizing process, and NCOS is a normalized cosine signal after the normalizing process, as shown in FIG. 6.

Next, in step 450, two square wave signals are generated. The normalized sine signal NSIN and the normalized cosine signal NCOS are added with each other and one is subtracted from the other respectively to generate the signals ADD and SUB.

Then, the signals ADD and SUB are converted into an additive square wave ADD_C and a subtractive square wave SUB_C respectively. The additive square wave ADD_C is generated based on the sum ADD of the normalized sine signal NSIN and the normalized cosine signal NCOS, wherein if the sum ADD is positive, the additive square wave ADD_C is logic 1; and if the sum ADD is negative, the additive square wave ADD_C is logic 0. On the other hand, the subtractive square wave SUB_C is generated based on the difference SUB of the normalized sine signal NSIN and the normalized cosine signal NCOS, wherein if the difference SUB is positive, the subtractive square wave SUB_C is logic 1; and if the difference SUB is negative, the subtractive square wave SUB_C is logic 0. The above signals are shown in FIG. 6.

In the scope of the present invention, the additive square wave ADD_C and the subtractive square wave SUB_C may have other definitions. The general rules are as follows: if the sum signal ADD is positive, the additive square wave ADD_C is in a first state, and if the sum signal ADD is negative, the additive square wave ADD_C is in a second state; on the other hand, if the difference signal SUB is positive, the subtractive square wave SUB_C is in a third state, and if the difference signal SUB is negative, the subtractive square wave SUB_C is in a fourth state. However, the first state is one of logic 1 and logic 0; the second state is one of logic 1 and logic 0 that is different from the first state. As such, the third state is one of logic 1 and logic 0; the fourth state is one of logic 1 and logic 0 that is different from the third state. If the additive square wave ADD_C and the subtractive square wave SUB_C have different definitions, those ordinary skilled in the art can easily make modifications to the method of the present embodiment, which are not described anymore herein.

Next, in step 455, a regional square wave REG is generated. The regional square wave REG is a result obtained by an exclusive OR operation of the additive square wave ADD_C and the subtractive square wave SUB_C, as shown in FIG. 6.

Then, in step 460, a saw-tooth wave ST is generated. The saw-tooth wave ST is typically formed through reorganizing the segments of the normalized sine signal NSIN and the normalized cosine signal NCOS. The saw-tooth wave ST is defined as that, if the subtractive square wave SUB_C is logic 1 and the regional square wave REG is logic 1, the saw-tooth wave ST is equal to the inverted normalized sine signal NSIN; if the subtractive square wave SUB_C is logic 1 and the regional square wave REG is logic 0, the saw-tooth wave ST is equal to the inverted normalized cosine signal NCOS; if the subtractive square wave SUB_C is logic 0 and the regional square wave REG is logic 1, the saw-tooth wave ST is equal to the normalized sine signal NSIN; and finally, if the subtractive square wave SUB_C is logic 0 and the regional square wave REG is logic 0, the saw-tooth wave ST is equal to the normalized cosine signal NCOS. The generated saw-tooth wave ST is shown in FIG. 6.

Similar to the definition of the above additive square wave ADD_C and subtractive square wave SUB_C, the definition of the saw-tooth wave ST is that the logic states 0, 1 of the subtractive square wave SUB_C or the regional square wave REG also can be exchanged at random. In the situation of exchanging the logic states, those with ordinary skills in the art can easily make modifications to the method of the present embodiment, which are not described any more herein.

After the saw-tooth wave is generated, the number of saw-tooth regions across which the moving part 501 is from the origin point is calculated in step 465. One region is one saw tooth of the saw-tooth wave ST. It can be seen by comparing with the signal timing of FIG. 6, a region is equal to ¼ period of the normalized sine signal NSIN or the normalized cosine signal NCOS. Each time the moving part 501 moves by a distance that is equal to the width of two adjacent magnetic polarities of the linear magnetic strip 306, both of the normalized sine signal NSIN and the normalized cosine signal NCOS undergo a cycle period. Since the pole pitch of the linear magnetic strip 306 is a known value, the number of regions of the saw-tooth wave ST can be used for calculating the moving distance of the moving part 501, thereby estimating the current position of the moving part 501.

The number of saw-tooth regions is calculated as follows. First, the direction of movement of the moving part 501 is identified based on the additive square wave ADD_C and the subtractive square wave SUB_C, wherein the identifying process is well known to those ordinary skilled in the art, which is not described any more. Then, the number of regions across which the moving part 501 is from the origin point is calculated based on the direction of movement and the rising edge and falling edge of the regional square wave REG. Since each time passing through the rising edge or the falling edge of the regional square wave REG indicates entering to another region of the saw-tooth wave ST, the number of regions from the origin point can be obtained simply by counting.

Figure 7:
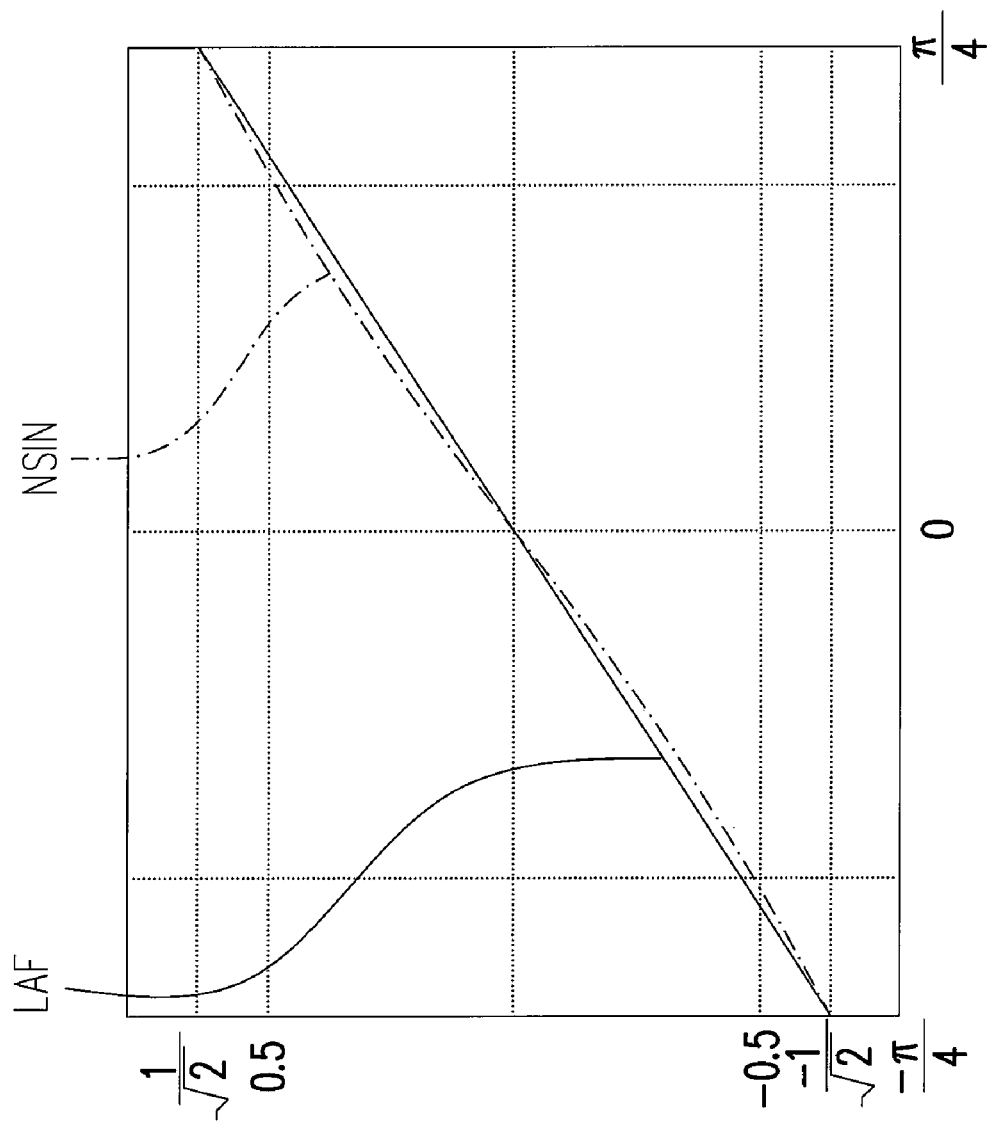
FIG. 7 is a schematic view of a linear approximation calculation according to an embodiment of the present invention.

Next, in step 470, the local position of the moving part 501 is estimated based on the pole pitch of the linear magnetic strip 306 and the saw-tooth wave ST. The so-called local position refers to the position of the moving part 501 locally placed within a single saw-tooth region. It can be seen by comparing the signal waves of FIG. 6, the saw-tooth wave ST is obtained by combining the parts of the normalized sine signal NSIN and the normalized cosine signal NCOS most approximate to the linear function. Taking the normalized sine signal NSIN as an example, as shown in FIG. 7, wherein the horizontal axis of FIG. 7 is the phase of the normalized sine signal NSIN, and the vertical axis is the sample value of the normalized sine signal NSIN. The phase of the normalized sine signal NSIN corresponds to the local position of the moving part 501. However, the microprocessor 314 cannot directly obtain the phase, but derive the phase of the normalized sine signal NSIN from its signal value. In order to avoid complicated and redundant calculations, this method uses the linear approximation function (LAF) as shown in FIG. 7 to replace the normalized sine signal NSIN. Thus, the phase can be quickly calculated and obtained from the signal value with few errors. For example, if the pole pitch is 0.8 mm, the error of the position estimation is about 3 μm, and therefore, the error is only 0.375% of the pole pitch.

As it can be seen from FIG. 7, the distance from phase 0 to phase $\pi/4$ corresponds to ⅛ of the pole pitch, and also corresponds to $1/\sqrt{2}$ of the signal value. Here, the pole pitch is defined as the width of two adjacent magnetic polarities on the linear magnetic strip. The following formula can be derived through LAF:

$$LPOS=PP/8+(\sqrt{2}/8)*PP*ST,$$

wherein, LPOS is the local position of the moving part 501; PP is the pole pitch; and ST is the signal value of the saw-tooth wave ST. PP/8 at the right of the equal sign corresponds to the distance from phase $-\pi/4$ to phase 0 in FIG. 7, because the local position is calculated from phase $-\pi/4$, not phase 0.

Before illustrating the next step, the original offset calculated in the above step 430 is described. When the moving part of the linear actuator returns to the origin point during initialization, it does not precisely reach the same origin point, and therefore, when calculating the actual position, the offset of the position when returning to the origin point should be calculated at first, that is the above-mentioned original offset. Based on the same principle, the calculation method and formula of the original offset are the same as that of the above local position.

Next, the current position of the moving part is estimated in step 475, with the calculation formula as follows.

$$CPOS=OFFSET+(PP/4)*NUM+LPOS,$$

wherein, CPOS is the current position of the moving part; OFFSET is the original offset; PP is the pole pitch; NUM is the number of regions across which the moving part is from the origin point; and LPOS is the local position of the moving part.

Finally, in step 480, it is checked whether the moving part has reached the target position or not, i.e., checking whether the current position has been equal to the target position or not. If yes, the flow chart of this method ends; otherwise, it returns to step 435 to continue moving towards the target, then estimating a new current position. Through the successive moving and modifications, the target position can definitely be reached.

Figure 8:
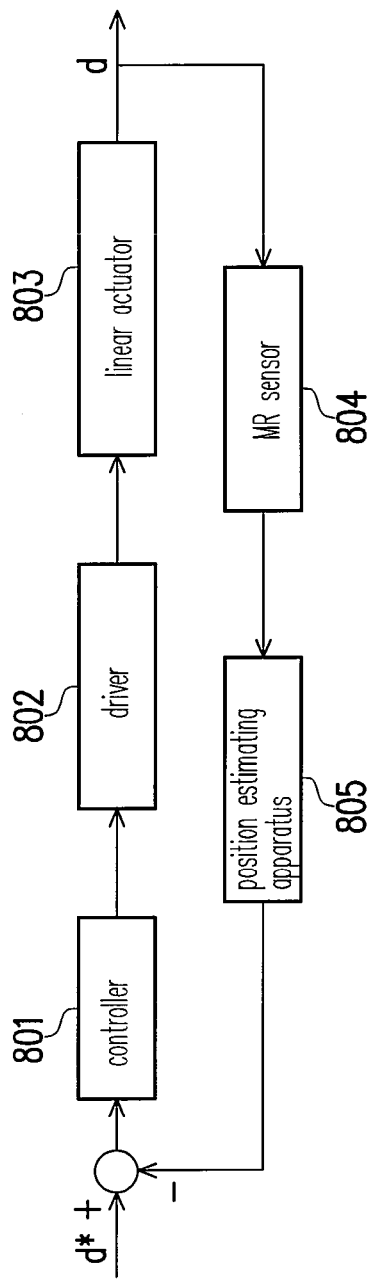
FIG. 8 is an architecture diagram of the position feedback control of a linear actuator according to another embodiment of the present invention.

The method for estimating the position of the moving part in the above embodiments also can be implemented through hardware, wherein the architecture is shown in FIG. 8. FIG. 8 is an architecture diagram of a position feedback control for a linear actuator according to another embodiment of the present invention. The apparatus 805 for estimating the position of a moving part of a linear actuator in the present invention receives magnetic signals output from an MR sensor 804, calculates a linear function representing the current position of the moving part, and provides it to a controller 801. Based on the current position and the target position to be reached for the moving part, the controller 801 controls the moving part of the linear actuator 803 through a driver 802.

Figure 9:
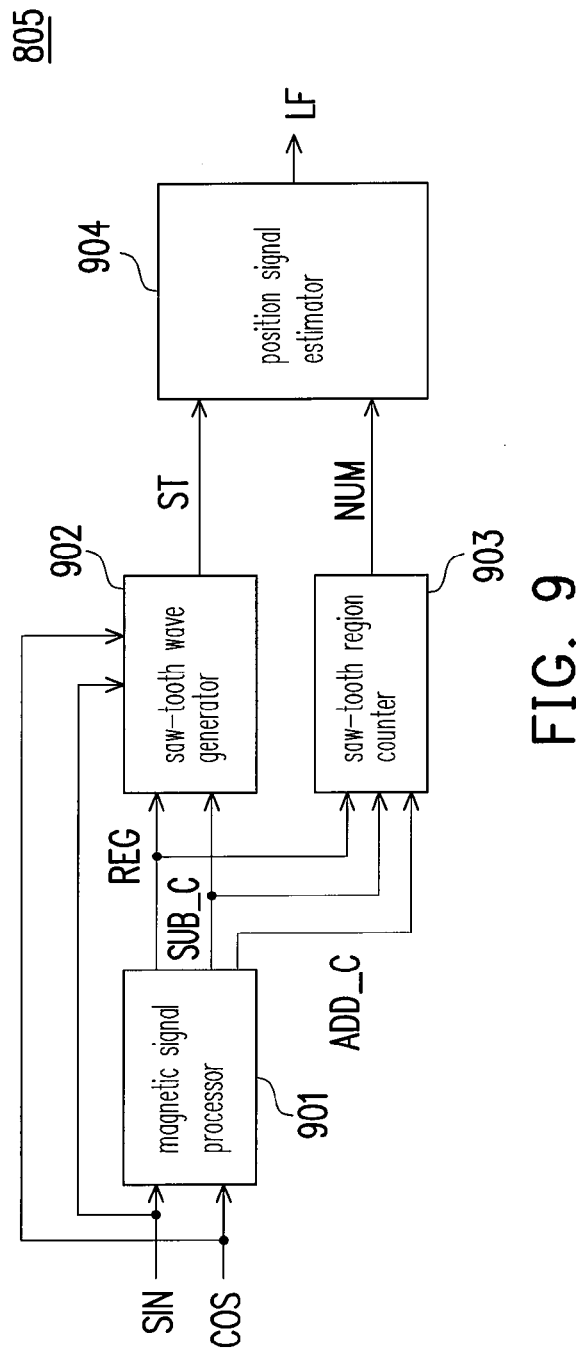
FIG. 9 is an architecture diagram of the apparatus for estimating the position of a moving part of a linear actuator in FIG. 8.

FIG. 9 is an architecture diagram of an apparatus 805 for estimating the position of a moving part of a linear actuator. The apparatus 805 for estimating the position of the moving part comprises a magnetic signal processor 901, a saw-tooth wave generator 902, a saw-tooth region counter 903, and a position signal estimator 904. In brief, the magnetic signal processor 901 generates an additive square wave ADD_C, a subtractive square wave SUB_C, and a regional square wave REG based on a sine signal SIN and a cosine signal COS generated by an MR sensor 804. The saw-tooth wave generator 902 generates a saw-tooth wave ST based on the sine signal SIN, the cosine signal COS, the subtractive square wave SUB_C, and the regional square wave REG. The saw-tooth region counter 903 calculates the number of regions NUM across which the moving part of the linear actuator 803 is from the origin point based on the additive square wave ADD_C, the subtractive square wave SUB_C, and the regional square wave REG. Finally, the position signal estimator 904 estimates a liner function LF of the current position of the moving part based on the saw-tooth wave ST and the number of regions NUM.

Figure 10:
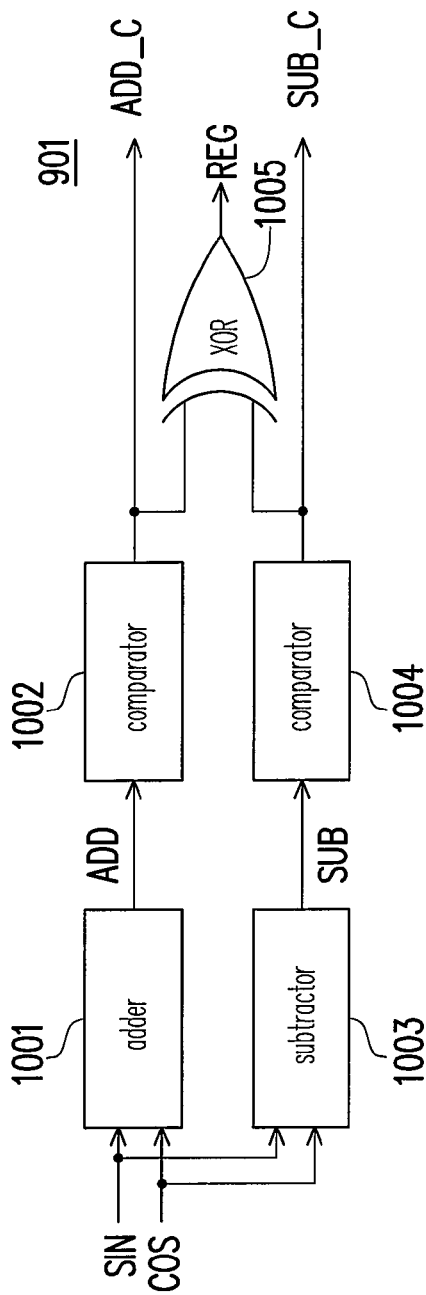
FIG. 10 is an architecture diagram of the magnetic signal processor of FIG. 9.

FIG. 10 is an architecture diagram of the magnetic signal processor 901. The magnetic signal processor 901 comprises an adder 1001, a comparator 1002, a subtractor 1003, a comparator 1004, and an exclusive OR gate (XOR gate) 1005. The adder 1001 calculates the sum ADD of the sine signal SIN and the cosine signal COS. The comparator 1002 outputs the additive square wave ADD_C based on the sum signal ADD, wherein if the sum signal ADD is positive, the additive square wave ADD_C is logic 1, and if the sum signal ADD is negative, the additive square wave ADD_C is logic 0. The subtractor 1003 calculates the difference SUB of the sine signal SIN and the cosine signal COS. The comparator 1004 outputs the subtractive square wave SUB_C based on the difference signal SUB, wherein if the difference signal SUB is positive, the subtractive square wave SUB_C is logic 1, and if the difference signal SUB is negative, the subtractive square wave SUB_C is logic 0. Finally, the XOR 1005 receives the additive square wave ADD_C and the subtractive square wave SUB_C, and outputs the regional square wave REG.

Figure 11:
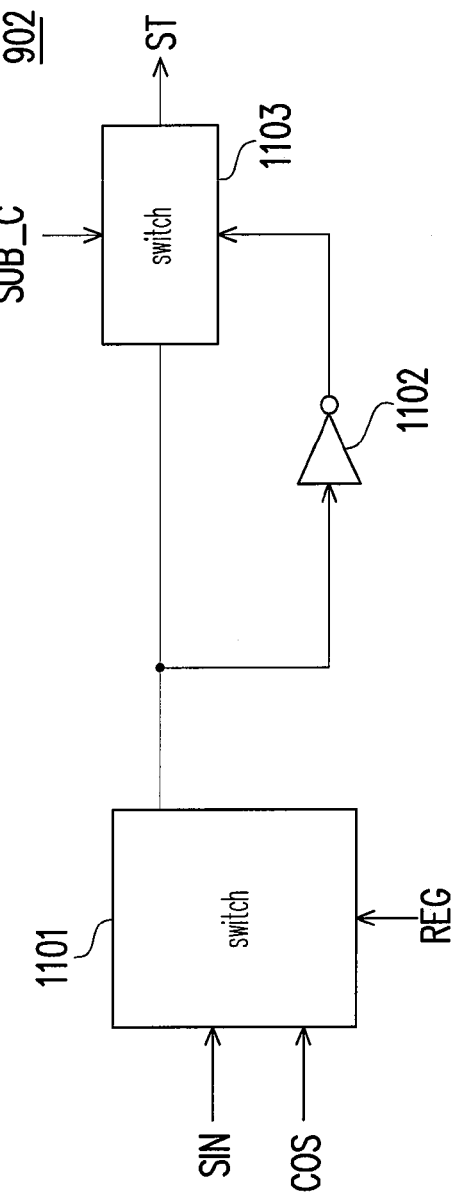
FIG. 11 is an architecture diagram of the saw-tooth wave generator of FIG. 9.

FIG. 11 is an architecture diagram of the saw-tooth wave generator 902. The saw-tooth wave generator 902 comprises switches 1101, 1103, and an inverter 1102. The switch 1101 receives the sine signal SIN and the cosine signal COS, wherein if the regional square wave REG is logic 1, the sine signal SIN is output, and if the regional square wave REG is logic 0, the cosine signal COS is output. The inverter 1102 is coupled to the output end of the switch 1101. The switch 1103 is coupled to the output end of the switch 1101 and the output end of the inverter 1102, wherein if the subtractive square wave SUB_C is logic 1, the output signal of the inverter 1102 is output, and if the subtractive square wave SUB_C is logic 0, the output signal of the switch 1101 is output.

Figure 12:
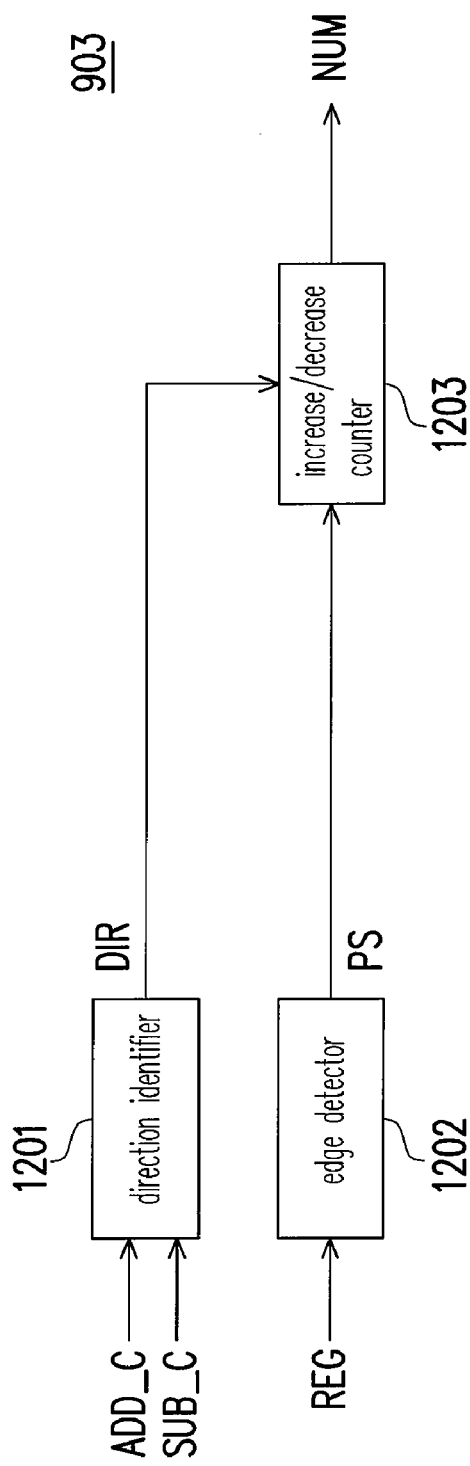
FIG. 12 is an architecture diagram of the saw-tooth region counter of FIG. 9.

FIG. 12 is an architecture diagram of the saw-tooth region counter 903. The saw-tooth region counter 903 comprises a direction identifier 1201, an edge detector 1202, and an increase/decrease counter 1203. The direction identifier 1201 identifies the direction of movement of the moving part based on the additive square wave ADD_C and the subtractive square wave SUB_C, and outputs the direction signal DIR based on the above direction of movement. The edge detector 1202 outputs the pulse signal PS, and enables the pulse signal PS when the rising edge or falling edge of the regional square wave REG is detected. The increase/decrease counter 1203 outputs the number of regions NUM across which the moving part is from the origin point, and increases or decreases the number of regions NUM based on the direction signal DIR when the pulse signal PS is enabled.

Figure 13:
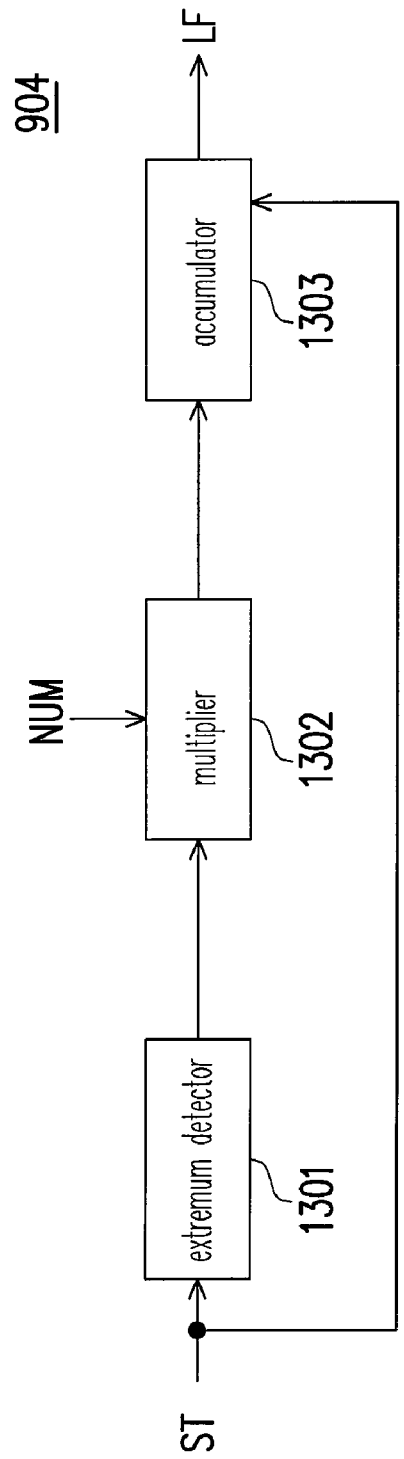
FIG. 13 is an architecture diagram of the position signal estimator of FIG. 9.

FIG. 13 is an architecture diagram of the position signal estimator 904. The position signal estimator 904 comprises an extremum detector 1301, a multiplier 1302, and an accumulator 1303. The extremum detector 1301 detects the maximum and minimum values of the saw-tooth wave ST, and outputs the result obtained by subtracting the minimum value from the maximum value of the saw-tooth wave ST, i.e., the height of each region for the saw-tooth wave. The multiplier 1302 calculates the number of regions NUM with the output value of the extremum detector 1301 and outputs the obtained result. Finally, the accumulator 1303 adds the saw-tooth wave ST with the output value of the multiplier 1302 to generate a linear function LF of the current position of the moving part. The linear function LF can be considered as the result obtained by overlapping each saw-tooth region of the saw-tooth wave ST, as shown in FIG. 6.

As mentioned in the above method embodiments, within the scope of the present invention, the logic states 1, 0 of each digital signal can be exchanged at random. After the logic states have been exchanged, those ordinary skilled in the art can easily make proper modifications to the apparatus for estimating the position of a moving part of a linear actuator 805 of the present embodiment, thus, it is not described any more.

As for the hardware architecture of the present embodiment, calculating the original offset is not required, that is because during the initialization, when the moving part of the linear actuator 803 returns to the origin point, the position estimation apparatus 805 has already generated a voltage that is equal to the original offset of the previous embodiment. As for the action of returning to the origin point, it can be carried out under the command of the external system, for example, the image digital signal processor in the previous embodiment.

As for the hardware architecture of the present embodiment, normalizing the original magnetic signals provided by the MR sensor 804 is not required any more; the original magnetic signals provided by the MR sensor 804 are directly used for the logic operation. As such, when the amplitude of the original sine signal SIN is different from that of the original cosine signal COS, errors may occur. There are two methods to avoid the errors. In the first method, the magnetic signals output by the MR sensor 804 are limited to have the two groups of magnetic signals with the same amplitude. In the second method, the original sine signal SIN and the original cosine signal COS are adjusted through a signal adjustment mechanism, such that both have the same amplitude. For example, in the present embodiment, a signal adjustor (not shown) is added to be coupled between the MR sensor 804 and the magnetic signal processor 901 of the position estimation apparatus 805, which is used for adjusting the amplitudes of the sine signal SIN and the cosine signal COS to be the same, and then outputting the sine signal SIN and the cosine signal COS to the magnetic signal processor 901.

In summary, the method for estimating the position of a moving part of a linear actuator of the present invention utilizes the calculation and analysis of the microprocessor instead of the expensive mixed-signal interpolation chip, with a much simpler and more rapid calculation process compared with the conventional method. Accordingly, the costs can be reduced, and the defect of slow and redundant calculations of conventional algorithms can be avoided. Moreover, the present invention uses the magnetic signals output by the MR sensor to carry out calculations through linear approximation, and if an ADC with high resolution is employed together, the resolution achieved can be several times than that of the conventional interpolation chip.

In addition, the apparatus for estimating the position of a moving part of a linear actuator of the present invention is mainly the implementation of the above method through hardware; therefore, it has the advantages of being simple, rapid, and with reduced costs as well. Moreover, the apparatus does not require microprocessor, but simple controllers, such that the system costs can be further reduced. The present apparatus is a hardware architecture, such that the successive random position can be achieved without any resolution problem. It can be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for estimating the position of a moving part of a linear actuator, comprising:
    (a) moving the moving part of the linear actuator towards a target position;
    (b) receiving magnetic signals of an MR sensor of the linear actuator, the magnetic signals including a sine signal and a cosine signal;
    (c) generating a first square wave, a second square wave, and a regional square wave based on the sine signal and the cosine signal;
    (d) generating a saw-tooth wave based on the sine signal, the cosine signal, the second square wave, and the regional square wave;
    (e) calculating a distance between the moving part and an origin point of a sliding track based on the first square wave, the second square wave, and the regional square wave, wherein the moving part is mounted on the sliding track and the distance is measured in a number of regions of the saw-tooth wave; and
    (f) estimating a current position of the moving part based on the saw-tooth wave and the number of regions.

2. The method for estimating the position of a moving part of a linear actuator as claimed in claim 1, wherein the first square wave is generated based on a sum of the sine signal and the cosine signal; the second square wave is generated based on a difference of the sine signal and the cosine signal; and the regional square wave is generated based on a logic operation result of the first square wave and the second square wave.

3. The method for estimating the position of a moving part of a linear actuator as claimed in claim 2, wherein
    if the sum is positive, the first square wave is in a first state, and if the sum is negative, the first square wave is in a second state;
    if the difference is positive, the second square wave is in a third state, and if the difference is negative, the second square wave is in a fourth state.

4. The method for estimating the position of a moving part of a linear actuator as claimed in claim 2, wherein the logic operation is an exclusive OR operation.

5. The method for estimating the position of a moving part of a linear actuator as claimed in claim 1, wherein
    if the second square wave is in a first state and the regional square wave is in a third state, the saw-tooth wave is equal to the inverted sine signal;
    if the second square wave is in the first state and the regional square wave is in a fourth state, the saw-tooth wave is equal to the inverted cosine signal;
    if the second square wave is in a second state and the regional square wave is in the third state, the saw-tooth wave is equal to the sine signal;
    if the second square wave is in the second state and the regional square wave is in the fourth state, the saw-tooth wave is equal to the cosine signal.

6. The method for estimating the position of a moving part of a linear actuator as claimed in claim 1, wherein step (e) comprises:
    identifying a direction of movement of the moving part based on the first square wave and the second square wave; and
    calculating the number of regions based on the direction of movement and rising edges and falling edges of the regional square wave.

7. The method for estimating the position of a moving part of a linear actuator as claimed in claim 1, wherein step (f) comprises:
    calculating a local position of the moving part based on a pole pitch of a linear magnetic strip of the moving part and the saw-tooth wave; and
    estimating the current position of the moving part based on the pole pitch, the number of regions, and the local position.

8. The method for estimating the position of a moving part of a linear actuator as claimed in claim 1, before step (a), further comprising:
    (g) moving the moving part back to the origin point;
    (h) moving the moving part to a terminal point of the sliding track; and
    (i) moving the moving part back to the origin point from the terminal point.

9. The method for estimating the position of a moving part of a linear actuator as claimed in claim 8, between step (i) and step (a), further comprising:
    retrieving maximum values and minimum values of the sine signal and the cosine signal; and
    calculating offsets and amplitudes of the sine signal and the cosine signal based on the maximum values and the minimum values of the sine signal and the cosine signal;
    and between step (b) and step (c), further comprising:
    normalizing the sine signal and the cosine signal based on the offsets and the amplitudes of the sine signal and the cosine signal.

10. The method for estimating the position of a moving part of a linear actuator as claimed in claim 8, between step (i) and step (a), further comprising:
    calculating the original offset of the moving part based on the pole pitch of the linear magnetic strip of the moving part and the magnetic signals generated by the MR sensor of the linear actuator;
    and step (f) further comprising:
    modifying the current position of the moving part with the original offset.

11. The method for estimating the position of a moving part of a linear actuator as claimed in claim 1, after step (f), further comprising:
    if the moving part has not reached the target position yet, return to step (a).

12. An apparatus for estimating the position of a moving part of a linear actuator, comprising:
    a magnetic signal processor, for generating a first square wave, a second square wave, and a regional square wave based on a sine signal and a cosine signal generated by a magneto-resistive sensor (MR sensor) of the linear actuator;
    a saw-tooth wave generator, for generating a saw-tooth wave based on the sine signal, the cosine signal, the second square wave, and the regional square wave;

a saw-tooth region counter, for calculating a distance between the moving part and an origin point of a sliding track based on the first square wave, the second square wave, and the regional square wave, wherein the moving part is mounted on the sliding track and the distance is measured in a number of regions of the saw-tooth wave; and a position signal estimator, for estimating the current position of the moving part based on the saw-tooth wave and the number of regions.

13. The apparatus for estimating the position of a moving part of a linear actuator as claimed in claim 12, wherein the first square wave is generated based on a sum of the sine signal and the cosine signal; the second square wave is generated based on a difference of the sine signal and the cosine signal; and the regional square wave is generated based on a logic operation result of the first square wave and the second square wave.

14. The apparatus for estimating the position of a moving part of a linear actuator as claimed in claim 13, wherein the magnetic signal processor comprises:

an adder, for calculating the sum of the sine signal and the cosine signal;

a first comparator, for outputting the first square wave based on the sum, wherein if the sum is positive, the first square wave is in a first state, and if the sum is negative, the first square wave is in a second state;

a subtractor, for calculating the difference of the sine signal and the cosine signal;

a second comparator, for outputting the second square wave based on the difference, wherein if the difference is positive, the second square wave is in a third state, and if the difference is negative, the second square wave is in a fourth state; and an exclusive OR gate (XOR gate), for receiving the first square wave and the second square wave, and outputting the regional square wave.

15. The apparatus for estimating the position of a moving part of a linear actuator as claimed in claim 12, wherein the saw-tooth wave generator comprises:

a first switch, for receiving the sine signal and the cosine signal, wherein if the regional square wave is in a first state, the sine signal is output, and if the regional square wave is in a second state, the cosine signal is output;

an inverter, coupled to an output end of the first switch; and a second switch, coupled to the output end of the first switch and an output end of the inverter, for outputting the output signal of the inverter if the second square wave is in a third state, and outputting the output signal of the first switch if the second square wave is in a fourth state.

16. The apparatus for estimating the position of a moving part of a linear actuator as claimed in claim 12, wherein the saw-tooth region counter comprises:

a direction identifier, for identifying the direction of movement of the moving part based on the first square wave and the second square wave, and outputting a direction signal based on the direction of movement;

an edge detector, for outputting a pulse signal, and enabling the pulse signal when a rising edge or a falling edge of the regional square wave is detected; and an increase/decrease counter, for outputting the number of regions, and increasing or decreasing the number of regions based on the direction signal when the pulse signal is enabled.

17. The apparatus for estimating the position of a moving part of a linear actuator as claimed in claim 12, wherein the position signal estimator comprises:

an extremum detector, for detecting a maximum value and a minimum value of the saw-tooth wave, and outputting the result obtained by subtracting the minimum value from the maximum value of the saw-tooth wave;

a multiplier, for multiplying the number of regions with the output value of the extremum detector and outputting the result of the multiplication; and an accumulator, for adding the saw-tooth wave with the output value of the multiplier to generate a linear function representing the current position of the moving part.

18. The apparatus for estimating the position of a moving part of a linear actuator as claimed in claim 12, wherein the sine signal and the cosine signal have same amplitude.

19. The apparatus for estimating the position of a moving part of a linear actuator as claimed in claim 12, further comprising:

a signal adjustor, coupled between the MR sensor and the magnetic signal processor, for adjusting the amplitudes of the sine signal and the cosine signal to be the same, and then outputting the sine signal and the cosine signal to the magnetic signal processor.

* * * * *